US012756966B2

(12) United States Patent
Ding et al.

(10) Patent No.: US 12,756,966 B2
(45) Date of Patent: Oct. 6, 2026

(54) EARBUD DEVICE

(71) Applicant: VIVO MOBILE COMMUNICATION CO., LTD., Guangdong (CN)

(72) Inventors: Song Ding, Guangdong (CN); Da Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 148 days.

(21) Appl. No.: 18/965,596

(22) Filed: Dec. 2, 2024

(65) Prior Publication Data

US 2025/0097620 A1 Mar. 20, 2025

Related U.S. Application Data

(63) Continuation of application No. PCT/CN2023/096471, filed on May 26, 2023.

(30) Foreign Application Priority Data

Jun. 2, 2022 (CN) ........................ 202210625527.8

(51) Int. Cl.
*H04R 1/1025* (2026.01)
*H04R 1/10* (2026.01)

(52) U.S. Cl.
CPC ......... *H04R 1/1025* (2013.01); *H04R 1/1016* (2013.01)

(58) Field of Classification Search
CPC .. H04R 1/1016; H04R 1/1025; H04R 1/1058; H04R 2460/17; H02J 7/70; H02J 7/731
See application file for complete search history.

(56) References Cited

U.S. PATENT DOCUMENTS

2005/0212479 A1 9/2005 Tsunoda
2015/0110320 A1 4/2015 Liu et al.

FOREIGN PATENT DOCUMENTS

CN 213462208 U 6/2021
CN 213846991 U * 7/2021

(Continued)

OTHER PUBLICATIONS

International Search Report and Written Opinion for PCT Application No. PCT/CN2023/096471, Mailed Sep. 8, 2023, 13 pages.

(Continued)

*Primary Examiner* — Sunita Joshi
(74) *Attorney, Agent, or Firm* — BROOKS KUSHMAN P.C.

(57) ABSTRACT

An earbud device, including: an earbud, where the earbud includes a housing and a movable part, the housing is provided with an accommodation chamber with an opening, a first charging contact is provided on the movable part, the first charging contact avoids the opening of the accommodation chamber when the movable part is at a first position, and the first charging contact is exposed at the opening of the accommodation chamber when the movable part is at a second position; and an earbud case, where the earbud case is provided with an accommodation groove, a second charging contact is provided in the accommodation groove, a driving part is arranged in the earbud case, the driving part drives the movable part to move from the first position to the second position during a process that the earbud is placed into the accommodation groove.

12 Claims, 5 Drawing Sheets

(56) References Cited

FOREIGN PATENT DOCUMENTS

| | | | | |
|---|---|---|---|---|
| CN | 113840203 A | | 12/2021 | |
| CN | 113840204 A | | 12/2021 | |
| CN | 114143654 A | * | 3/2022 | ............... H04R 1/10 |
| CN | 114339528 A | | 4/2022 | |
| CN | 114845202 A | | 8/2022 | |

OTHER PUBLICATIONS

First Chinese Office Action for Chinese Patent Application No. 202210625527.8 mailed Jun. 24, 2024. 16 pages.

* cited by examiner

EARBUD DEVICE

CROSS-REFERENCE TO RELATED APPLICATIONS

This application is a continuation of International Application No. PCT/CN2023/096471 filed on May 26, 2023, which claims priority to Chinese Patent Application No. 202210625527.8 filed on Jun. 2, 2022, which are incorporated herein by reference in their entireties.

TECHNICAL FIELD

This application relates to the technical field of terminals, and in particular, to an earbud device.

BACKGROUND

In the related art, a method for charging and storing a wireless earbud is to accommodate a wireless earbud into an earbud case and charge the earbud by means of a power supply in the earbud case. The earbud case and the wireless earbud are in contact, by means of a charging spring sheet in the earbud case and a charging contact of the wireless earbud, with each other for charging.

Because the charging contact of the wireless earbud is always exposed to a surface of the earbud, the wireless earbud may be corroded by air or external moisture during use, and especially during movement, moisture sticking to leaked copper of the wireless earbud not only causes corrosion but even short-circuits a charging circuit. Stains or impurities may stick to the charging contact of the earbud. When the earbud is placed into the earbud case, the stains or the impurities may stick to the charging spring sheet in the earbud case, which is likely to damage the charging circuit in the earbud case.

SUMMARY

An objective of an embodiment of this application is to provide an earbud device.

An embodiment of this application provides an earbud device, including:

an earbud, where the earbud includes a housing and a movable part, the housing is provided with an accommodation chamber with an opening, a first charging contact is arranged on the movable part, the first charging contact avoids the opening of the accommodation chamber when the movable part is at a first position, and the first charging contact is exposed at the opening of the accommodation chamber when the movable part is at a second position; and an earbud case, where the earbud case is provided with an accommodation groove, a second charging contact is arranged in the accommodation groove, a driving part is arranged in the earbud case, the driving part drives the movable part to move from the first position to the second position during a process that the earbud is placed into the accommodation groove, and the driving part drives the movable part to move from the second position to the first position during a process that the earbud is taken out from the accommodation groove, where when the earbud is placed into the accommodation groove, the first charging contact is electrically connected to the second charging contact.

Optionally, the earbud device further includes: a transmission part, where the transmission part includes:

a rotating shaft, where the movable part is arranged on the rotating shaft, the rotating shaft is rotatably arranged on the housing, the driving part can drive the rotating shaft to rotate, and when the rotating shaft rotates, the rotating shaft drives the movable part to move between the first position and the second position.

Optionally, the transmission part further includes:

a gear, where the gear is sleeved on the rotating shaft; and a rack, where the rack meshes with the gear, the driving part can drive the rack to move, the rack drives the gear to rotate during movement, and the gear drives the rotating shaft to rotate.

Optionally, the transmission part further includes:

a first magnet, where the first magnet is arranged on the rack, the driving part can drive the first magnet to move, and the first magnet drives the rack to move;

the driving part includes a second magnet, and the first magnet and the second magnet can magnetically attract or repel each other; and during the process that the earbud is placed into the accommodation groove, the second magnet drives the first magnet to move in a first movement direction, and the first magnet drives the movable part to move from the first position to the second position.

Optionally, the driving part includes a third magnet, and the first magnet and the third magnet can magnetically attract or repel each other; and during a process that the earbud is taken out from the accommodation groove, the third magnet drives the first magnet to move in a second movement direction, the first magnet drives the movable part to move from the second position to the first position, and the first movement direction is opposite to the second movement direction.

Optionally, during a process that the earbud is placed into the accommodation groove, the third magnet and the second magnet are sequentially disposed at an interval in a movement direction of the earbud.

Optionally, an inner side wall of the accommodation chamber is provided with a guide groove, and the rack is arranged in the guide groove.

Optionally, the first charging contact includes a first conductive part and a second conductive part that are disposed at an interval, and the first conductive part is electrically connected to the second conductive part;

when the movable part is at the first position, the first conductive part and the second conductive part avoid the opening of the accommodation chamber; and when the movable part is at the second position, the first conductive part is exposed at the opening of the accommodation chamber, and when the earbud is placed into the accommodation groove, the first conductive part is electrically connected to the second charging contact.

Optionally, the earbud is provided with a first power supply part, and when the movable part is at the second position, the second conductive part is electrically connected to the first power supply part.

Optionally, the earbud further includes:

a first magnet, where the movable part is connected to the first magnet, the driving part includes a second magnet, and the first magnet and the second magnet can magnetically attract or repel each other; and during the process that the earbud is placed into the accommodation groove, the second magnet drives the first magnet to move in a first movement direction, and the first magnet drives the movable part to move from the first position to the second position.

Optionally, the driving part includes a third magnet, and the first magnet and the third magnet can magnetically attract or repel each other; and during a process that the earbud is taken out from the accommodation groove, the third magnet drives the first magnet to move in a second movement direction, the first magnet drives the movable part to move from the second position to the first position, and the first movement direction is opposite to the second movement direction.

Optionally, during a process that the earbud is placed into the accommodation groove, the third magnet and the second magnet are sequentially disposed at an interval in a movement direction of the earbud.

REFERENCE SIGNS

Figure 1:
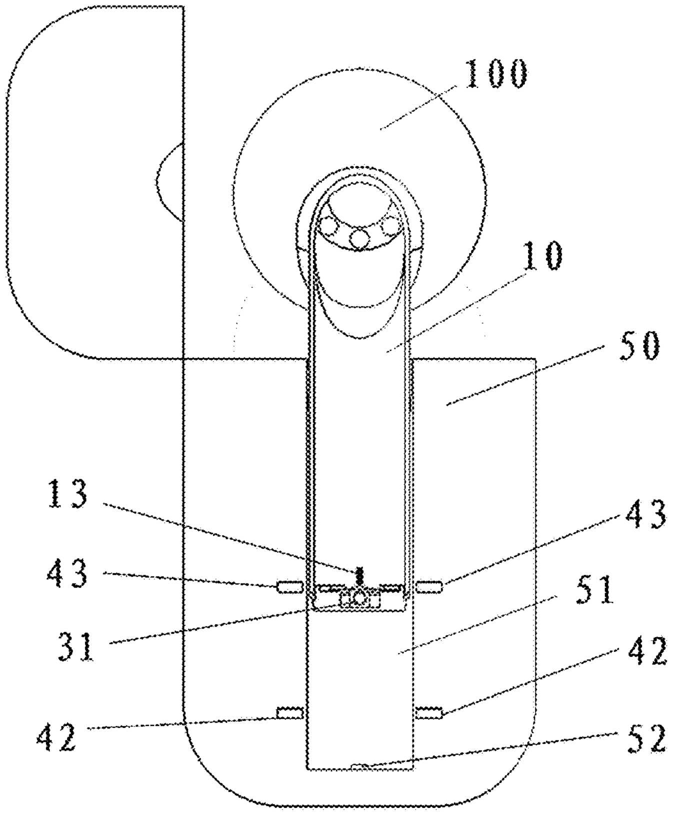
FIG. 1 is a schematic diagram of an earbud placed into an earbud case.

Earbud 100;

housing 10; accommodation chamber 11; guide groove 12; conductive contact 13;

limiting groove 14; elastic member 15; connecting base 16;

limiting table 17; conductive column 18; boss 19;

movable part 20; first conductive part 21; second conductive part 22; first charging contact 23;

rotating shaft 30; gear 31; rack 32;

first magnet 41; second magnet 42; third magnet 43;

earbud case 50; accommodation groove 51; second charging contact 52.

DETAILED DESCRIPTION

The technical solutions in embodiments of this application are clearly described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

The terms such as "first" and "second" in the description and claims of this application are intended to distinguish similar objects, but are not intended to describe a specific sequence or order. It should be understood that data used in such a way is interchangeable where appropriate so that the embodiments of this application can be implemented in an order other than those illustrated or described herein. In addition, "and/or" in the description and the claims indicates at least one of connected objects, and the character "/" generally indicates an "or" relationship between associated objects.

With reference to FIG. 1 to FIG. 10, an earbud device according to an embodiment of this application is described in detail below through specific embodiments and application scenarios thereof.

As shown in FIG. 1 to FIG. 10, an earbud device according to the embodiment of this application may include: an earbud 100 and an earbud case 50. The earbud 100 includes a housing 10 and a movable part 20. The housing 10 is provided with an accommodation chamber 11 with an opening, and the movable part 20 can move. A first charging contact 23 is arranged on the movable part 20, and the movable part 20 can be switched between a first position and a second position. The first charging contact 23 avoids the opening of the accommodation chamber 11 when the movable part 20 is at the first position, to prevent the first charging contact 23 from being in contact with an external environment, reduce corrosion by air or external moisture, and prevent stains or impurities from contaminating the first charging contact 23. When the movable part 20 is at the second position, the first charging contact 23 may be exposed at the opening of the accommodation chamber 11, so that the first charging contact 23 may be electrically connected to a second charging contact in the earbud case 50, so as to charge the earbud 100.

The earbud case 50 is provided with an accommodation groove 51, and the earbud 100 may be placed into the accommodation groove 51 or taken out from the accommodation groove 51. A second charging contact 52 is provided in the accommodation groove 51. A driving part is arranged in the earbud case 50, and the driving part can drive the movable part 20 to move from the first position to the second position during a process that the earbud 100 is placed into the accommodation groove 51. The driving part can drive the movable part 20 to move from the second position to the first position during a process that the earbud 100 is taken out from the accommodation groove 51. The driving part can drive the movable part 20 to be switched between the first position and the second position. The driving part may include a magnet, and the movable part 20 may be a member made of a magnetic material or a magnetic member may be provided on the movable part 20. The movable part 20 can be switched between the first position and the second position by means of a magnetic force between the magnet and the magnetic member. The driving part may include an electro-deformable member, and when a current is input to the electro-deformable member, the electro-deformable member is deformed, and a deformation generated by the electro-deformable member can drive the movable part 20 to be switched between the first position and the second position. When the earbud 100 is placed into the accommodation groove 51, the first charging contact 23 may be electrically connected to the second charging contact 52. The second charging contact 52 may be a charging spring sheet, and the second charging contact 52 may be electrically connected to a second power supply part in the earbud case 50, so that the earbud 100 can be charged by the second power supply part.

During use, when the movable part 20 is adjusted to the first position, the first charging contact 23 avoids the opening of the accommodation chamber 11, so as to prevent the first charging contact 23 from being in contact with an external environment, reduce corrosion by air or external moisture, and prevent stains or impurities from contaminating the first charging contact 23, thereby preventing the stains or the impurities from contaminating the charging spring sheet in the earbud case 50 when the earbud 100 is placed into the earbud case 50, and avoiding damage to a charging circuit in the earbud case 50. When the earbud 100 is placed into the earbud case 50 for charging, the movable part 20 is adjusted to the second position, and the first charging contact 23 is exposed at the opening of the accommodation chamber 11, so that the first charging contact 23 may be electrically connected to the second charging contact 52 in the earbud case 50, so as to charge the earbud 100.

Figure 6:
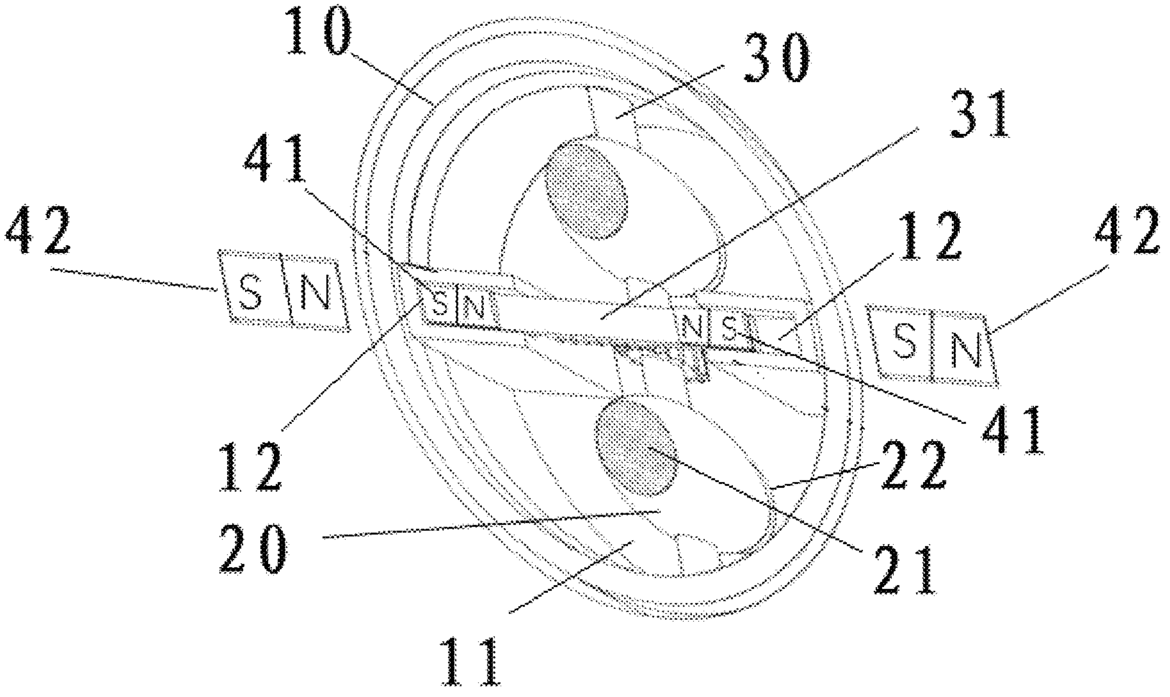
FIG. 6 is another schematic diagram showing leftward movement of a rack.
Figure 9:
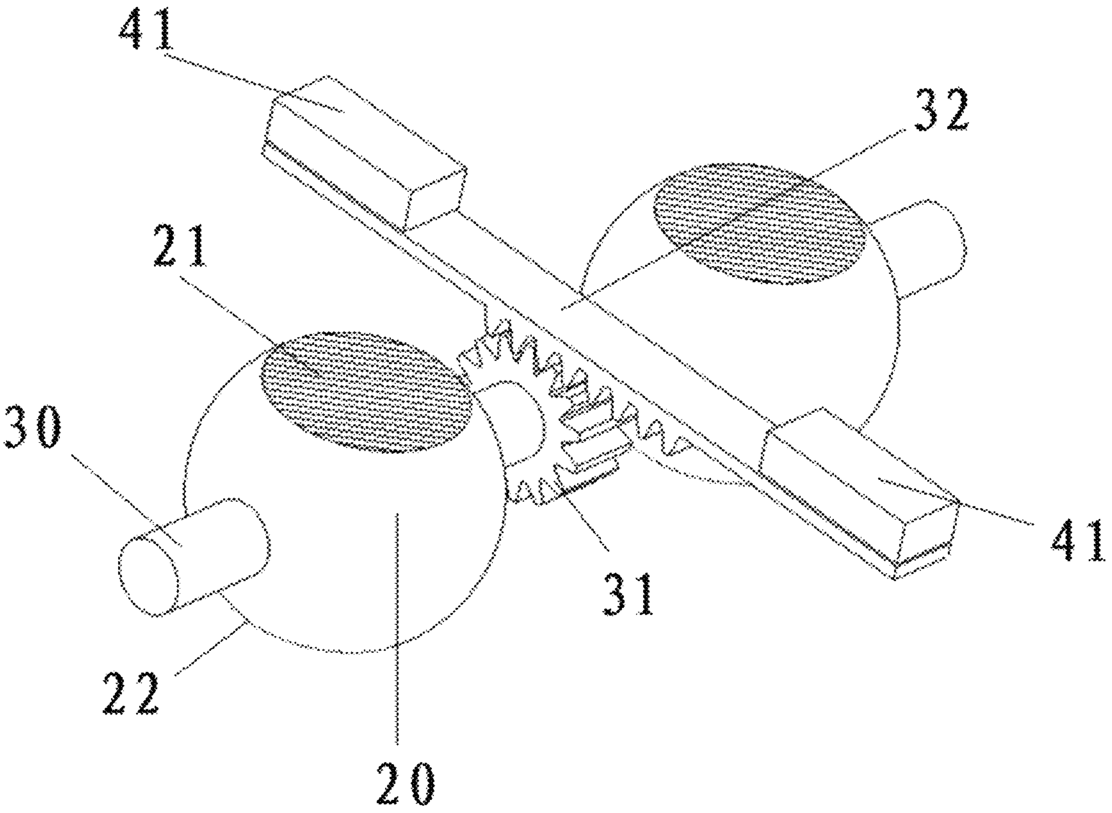
FIG. 9 is a schematic diagram showing fitting between a gear and a rack.

In some embodiments, as shown in FIG. 6 and FIG. 9, the earbud device further includes: a transmission part. The transmission part may include: a rotating shaft 30. The movable part 20 may be arranged on the rotating shaft 30, and the rotating shaft 30 is rotatably arranged on the housing 10. The driving part can drive the rotating shaft 30 to rotate, and when the rotating shaft 30 rotates, the rotating shaft 30 drives the movable part 20 to be switched between the first position and the second position. The rotating shaft 30 may be arranged in the accommodation chamber 11, and an inner side wall of the accommodation chamber 11 may be provided with rotating holes. Two ends of the rotating shaft 30 may be arranged in the rotating holes, and the two ends of the rotating shaft 30 can rotate in the rotating holes. The driving part can drive the rotating shaft 30 to rotate, and the rotation of the rotating shaft 30 can drive the movable part 20 to rotate, so that the movable part 20 can be switched between the first position and the second position, and therefore the first charging contact 23 can avoid the opening of the accommodation chamber 11 or the first charging contact 23 is exposed at the opening of the accommodation chamber 11.

In some other embodiments, as shown in FIG. 1 to FIG. 9, the transmission part may further include: a gear 31 and a rack 32. The gear 31 may be sleeved on the rotating shaft 30, and the rack 32 meshes with the gear 31. The driving part can drive the rack 32 to move, and the rack 32 can drive the gear 31 to rotate during movement. The gear 31 drives the rotating shaft 30 to rotate, and the rotation of the rotating shaft 30 can drive the movable part 20 to rotate, so that the movable part 20 can be switched between the first position and the second position.

In the embodiment of this application, as shown in FIG. 1 to FIG. 9, the transmission part may further include: a first magnet 41. The first magnet 41 is arranged on the rack 32. One or more first magnets 41 may be provided, for example, two first magnets 41 may be provided, and the first magnets 41 may be arranged at two ends of the rack 32. The driving part can drive the first magnet 41 to move, and the first magnet 41 can drive the rack 32 to move during movement. The driving part may include a second magnet 42. One or more second magnets 42 may be provided. The first magnet 41 and the second magnet 42 can magnetically attract or repel each other. During the process that the earbud 100 is placed into the accommodation groove 51, the second magnet 42 can drive the first magnet 41 to move in a first movement direction, and the first magnet 41 drives the movable part 20 to move from the first position to the second position. When the first magnet 41 and the second magnet 42 magnetically attract or repel each other, the second magnet 42 drives the first magnet 41 to move, and the first magnet 41 drives the rack 32 to move. The second magnet 42 may be a magnet arranged on the earbud case 50. During the process that the earbud 100 is placed into the accommodation groove 51, the second magnet 42 can drive the first magnet 41 to move by means of magnetic action between the first magnet 41 and the second magnet 42, the first magnet 41 drives the rack 32 to move, and the rack 32 drives the gear 31 to rotate during movement. The gear 31 drives the rotating shaft 30 to rotate, and the rotation of the rotating shaft 30 can drive the movable part 20 to rotate, so that the movable part 20 can move from the first position to the second position.

Optionally, as shown in FIG. 1 to FIG. 4, the driving part may include a third magnet 43. One or more third magnets 43 may be provided. The first magnet 41 and the third magnet 43 can magnetically attract or repel each other. During the process that the earbud 100 is taken out from the accommodation groove 51, the third magnet 43 can drive the first magnet 41 to move in a second movement direction by means of a magnetic force between the first magnet 41 and the third magnet 43, and the first magnet 41 drives the movable part 20 to move from the second position to the first position. The first movement direction is opposite to the second movement direction. During driving, the first magnet 41 drives the rack 32 to move, and the rack 32 drives the gear 31 to rotate during movement. The gear 31 drives the rotating shaft 30 to rotate, and the rotation of the rotating shaft 30 can drive the movable part 20 to rotate, so that the movable part 20 can move from the second position to the first position.

Figure 4:
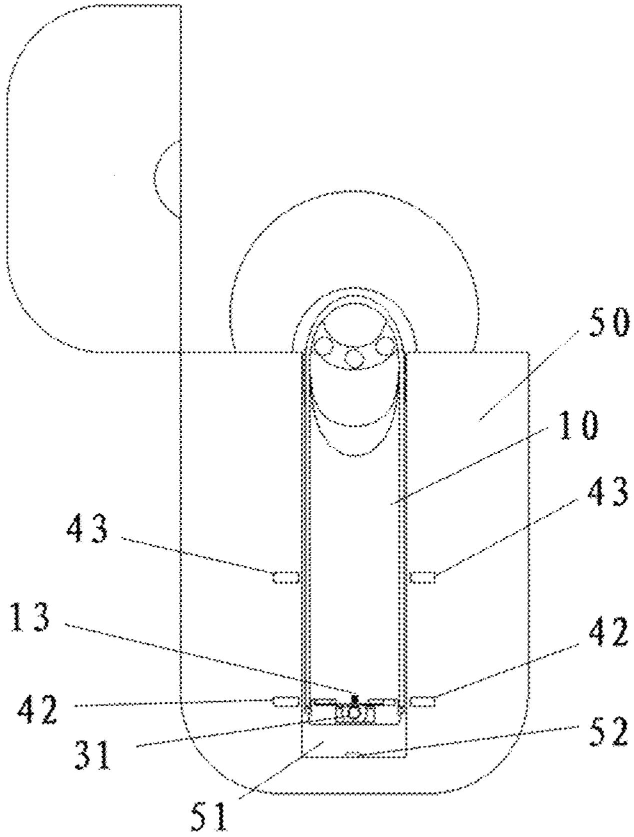
FIG. 4 is another schematic diagram of an earbud placed into an earbud case.
Figure 7:
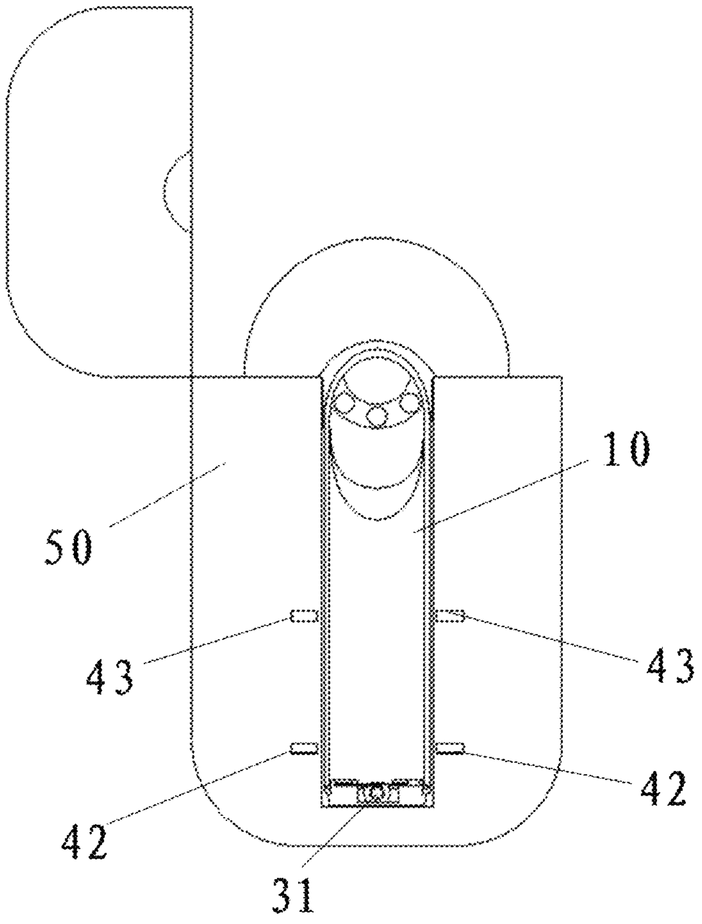
FIG. 7 is a schematic diagram of an earbud placed into an earbud case and in a charged state.
Figure 8:
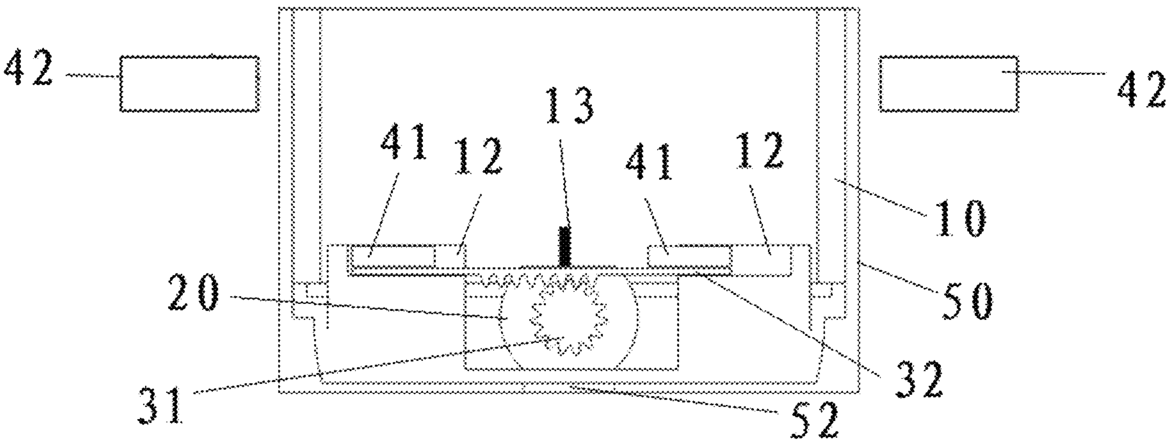
FIG. 8 is a schematic diagram of a movable part at a second position.

In some embodiments, as shown in FIG. 1, FIG. 4, and FIG. 7, during the process that the earbud 100 is placed into the accommodation groove 51, the third magnet 43 and the second magnet 42 may be sequentially disposed at an interval in a movement direction of the earbud 100. During the process that the earbud 100 is placed into the accommodation groove 51, the second magnet 42 can drive the first magnet 41 to move, so that the movable part 20 can move from the first position to the second position. When the movable part 20 is at the second position, the first charging contact 23 is exposed at the opening of the accommodation chamber 11, so that the first charging contact 23 may be electrically connected to the second charging contact 52 in the earbud case 50, so as to charge the earbud. During the process that the earbud is placed in or taken out, the position of the movable part 20 can be switched. During the process that the earbud 100 is taken out from the accommodation groove 51, the third magnet 43 can drive the first magnet 41 to move, and the first magnet 41 drives the movable part 20 to move from the second position to the first position. The first charging contact 23 avoids the opening of the accommodation chamber 11 when the movable part 20 is at the first position, to prevent the first charging contact 23 from being in contact with an external environment, reduce corrosion by air or external moisture, and prevent stains or impurities from contaminating the first charging contact 23.

Optionally, as shown in FIG. 3, FIG. 5, FIG. 6, and FIG. 8, an inner side wall of the accommodation chamber 11 may be provided with a guide groove 12, and the rack 32 may be arranged in the guide groove 12. Two ends of the rack 32 may be arranged in the guide groove 12, and the two ends of the rack 32 can move in the guide groove 12. The movement of the rack 32 can be guided through the guide groove 12, so that the rack 32 can move stably.

In some embodiments, two movable parts 20 may be provided, and the two movable parts 20 may be disposed at an interval in a length direction of the rotating shaft 30. Each movable part 20 may be spherical, and the movable part 20 may be provided with a through hole. The movable part 20 may be sleeved on the rotating shaft 30 through the through hole. The gear 31 may be located between the two movable parts 20, and the two movable parts 20 may be symmetrically arranged with respect to the gear 31, such that the rotating shaft 30 can stably drive the movable parts 20 to rotate, and therefore the movable parts 20 can be switched between the first position and the second position.

Figure 3:
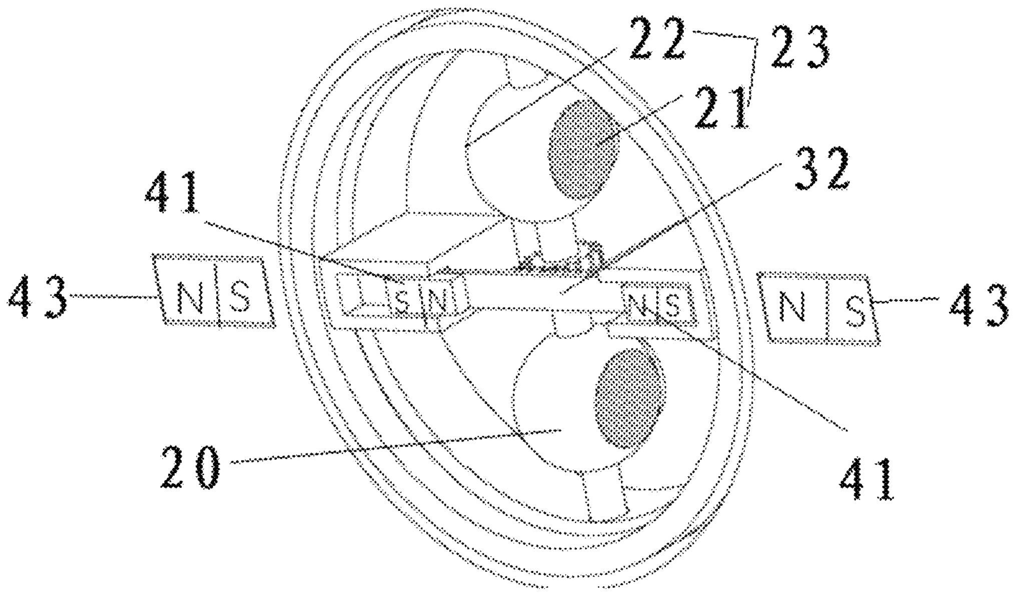
FIG. 3 is another schematic diagram showing rightward movement of a rack.

In some embodiments, as shown in FIG. 3, FIG. 6, and FIG. 9, the first charging contact 23 may include a first conductive part 21 and a second conductive part 22 that are disposed at an interval, and the first conductive part 21 is electrically connected to the second conductive part 22. When the movable part 20 is at the first position, the first conductive part 21 and the second conductive part 22 avoid the opening of the accommodation chamber 11. When the movable part 20 is at the second position, the first conductive part 21 is exposed at the opening of the accommodation chamber 11, and when the earbud 100 is placed into the accommodation groove 51, the first conductive part 21 is electrically connected to the second charging contact 52.

A first conductive part 21 and a second conductive part 22 that are disposed at an interval may be provided on the movable part 20. The first conductive part 21 and the second conductive part 22 may be oppositely arranged. The first conductive part 21 may be arranged at one end or on one side of the movable part 20, and the second conductive part 22 may be arranged at the other end or on the other side of the movable part 20. The first conductive part 21 is electrically connected to the second conductive part 22. The movable part 20 may be cylindrical or spherical, or may be in other shapes according to an actual situation. The first conductive part 21 and the second conductive part 22 each may be a member made of a metal material. The movable part 20 may be a conductive member with a surface coated with an insulation layer. The movable part 20 may be a metal conductive member with a surface coated with an insulation layer. For example, the movable part 20 may be a copper conductive member with a surface coated with an insulation layer, and a corresponding surface area of the conductive member is coated with no insulation layer, so that a conductive portion of the conductive member is exposed, thereby forming a first conductive part 21 and a second conductive part 22.

The movable part 20 can be switched between the first position and the second position. The first conductive part 21 and the second conductive part 22 avoid the opening of the accommodation chamber 11 when the movable part 20 is at the first position, to prevent the first conductive part 21 and the second conductive part 22 from being in contact with an external environment, reduce corrosion by air or external moisture, and prevent stains or impurities from contaminating the first conductive part 21 and the second conductive part 22. The first conductive part 21 is exposed at the opening of the accommodation chamber 11 when the movable part 20 is at the second position. The earbud 100 may be provided with a first power supply part. The second conductive part 22 may be electrically connected to the first power supply part, the second conductive part 22 may be electrically connected to a conductive contact 13 on the first power supply part, and the first conductive part 21 may be electrically connected to the second charging contact 52 in the earbud case 50, so as to charge the earbud.

Figure 10:
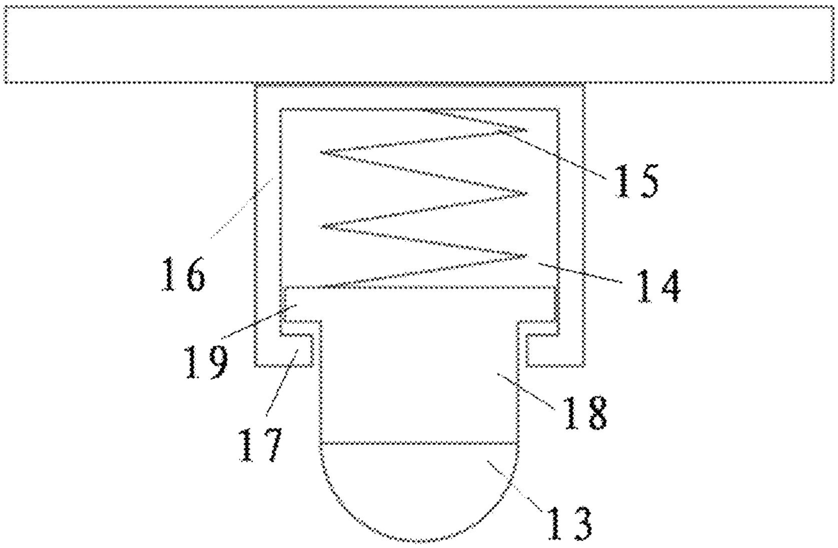
FIG. 10 is a schematic diagram showing fitting between a conductive column and a connecting base.

As shown in FIG. 10, a connecting base 16 may be arranged on the first power supply part, and the connecting base 16 may be provided with a limiting groove 14. A limiting table 17 is arranged on an inner side wall of the limiting groove 14. One end of a conductive column 18 extends into the limiting groove 14, and a boss 19 is arranged at the conductive column 18 above the limiting table 17. The boss 19 is arranged along a periphery of one end of the conductive column 18, and a conductive contact 13 is provided at the other end of the conductive column 18. An elastic member 15 is arranged between an end portion of an end of the conductive column 18 and a bottom of the limiting groove 14. The elastic member 15 may be a member made of a conductive material, such as a metal member. The clastic member 15 may be electrically connected to the conductive column 18, and the elastic member 15 may be a spring. An end of the conductive column 18 can move in the limiting groove 14, and the moving range of the conductive column 18 can be limited by cooperation between the limiting table 17 and the boss 19. When the movable part 20 is at the second position, the second conductive part 22 may be electrically connected to the conductive contact 13 on the first power supply part. In this case, the elastic member 15 may be in a compressed state, and the second conductive part 22 can be stably connected to the conductive contact 13 through an elastic force of the elastic member 15. The conductive contact 13 may be a spring sheet or a spring pin welded to a charging main board, and the spring sheet or the spring pin can telescopically move.

An elastic layer may be provided on the inner side wall of the accommodation chamber 11 corresponding to the first conductive part 21 and the second conductive part 22. The first conductive part 21 and the second conductive part 22 avoid the opening of the accommodation chamber 11 when the movable part 20 is at the first position. Surfaces of the first conductive part 21 and the second conductive part 22 may abut against and be in contact with the elastic layer, and the elastic layer may have a sealing effect. A small gap is provided between the surfaces of the first conductive part 21 and the second conductive part 22 and the elastic layer, which reduces contact between an external environment and the first conductive part 21 and the second conductive part 22, reduces corrosion by air or external moisture, and prevents stains or impurities from contaminating the first conductive part 21 and the second conductive part 22. The movable part 20 can be switched between the first position and the second position, and the elastic layer can wipe off contaminants on the surfaces of the first conductive part 21 and the second conductive part 22 through the movable switching of the movable part 20.

In the earbud according to the embodiment of this application, the first conductive part 21 and the second conductive part 22 that are disposed at an interval are arranged on the movable part 20, and the positions of the first conductive part 21 and the second conductive part 22 can be adjusted by the movement of the movable part 20. The first conductive part 21 and the second conductive part 22 avoid the opening of the accommodation chamber 11 when the movable part 20 is at the first position. The first conductive part 21 is exposed at the opening of the accommodation chamber 11 when the movable part 20 is at the second position, and the second conductive part 22 is electrically connected to the first power supply part. During use, when the movable part 20 is adjusted to the first position, the first conductive part 21 and the second conductive part 22 avoid the opening of the accommodation chamber 11, so as to prevent the first conductive part 21 and the second conductive part 22 from being in contact with an external environment, reduce corrosion by air or external moisture, and prevent stains or impurities from contaminating the first conductive part 21 and the second conductive part 22, thereby preventing the stains or the impurities from contaminating the charging spring sheet in the earbud case 50 when the earbud is placed into the earbud case 50, and avoiding damage to a charging circuit in the earbud case 50. When the earbud is placed into the earbud case 50 for charging, the movable part 20 is adjusted to the second position, the first conductive part 21 is exposed at the opening of the accommodation chamber 11, and the second conductive part 22 is electrically connected to the first power supply part, so that the first conductive part 21 may be electrically connected to the charging spring sheet in the earbud case 50, so as to charge the earbud.

Optionally, the earbud 100 is provided with a first power supply part, and when the movable part 20 is at the second position, the second conductive part 22 may be electrically connected to the first power supply part, so that the earbud can be charged.

In some embodiments, the earbud may further include: a first magnet 41. The movable part 20 may be connected to the first magnet 41. The driving part may include a second magnet 42. One or more second magnets 42 may be provided. The first magnet 41 and the second magnet 42 can magnetically attract or repel each other. During the process that the earbud is placed into the accommodation groove 51, the second magnet 42 can drive the first magnet 41 to move in a first movement direction by means of magnetic action between the first magnet 41 and the second magnet 42, and the first magnet 41 drives the movable part 20 to move from the first position to the second position.

In some other embodiments, the driving part may include a third magnet 43. One or more third magnets 43 may be provided. The first magnet 41 and the third magnet 43 can magnetically attract or repel each other. During the process that the earbud is taken out from the accommodation groove 51, the third magnet 43 can drive the first magnet 41 to move in a second movement direction by means of a magnetic force between the first magnet 41 and the third magnet 43, and the first magnet 41 drives the movable part 20 to move from the second position to the first position. The first movement direction is opposite to the second movement direction.

Optionally, during the process that the earbud is placed into the accommodation groove 51, the third magnet 43 and the second magnet 42 are sequentially disposed at an interval in a movement direction of the earbud. The movable part 20 can move from the first position to the second position during the process that the earbud is placed into the accommodation groove 51. The first magnet 41 drives the movable part 20 to move from the second position to the first position during the process that the earbud is taken out from the accommodation groove 51. During the process that the earbud is placed in or taken out, the position of the movable part 20 can be switched.

In some embodiments, the third magnet 43 may be located above the second magnet 42. During the process that the earbud 100 is placed into the accommodation groove 51, the first magnet 41 first approaches the third magnet 43. When the first magnet 41 is approaching the third magnet 43, the third magnet 43 can drive the first magnet 41 to move, the first magnet 41 can drive the rack 32 to move in the second movement direction, and the rack 32 drives the movable part 20 to be at the first position. When the earbud continues to move to a bottom of the accommodation groove 51, the first magnet 41 moves away from the third magnet 43, and the first magnet 41 approaches the second magnet 42. The second magnet 42 can drive the first magnet 41 to move, the first magnet 41 can drive the rack 32 to move in the first movement direction, and when the rack 32 drives the movable part 20 to be at the second position, the first conductive part 21 may be electrically connected to the second charging contact 52 in the earbud case 50, so as to charge the earbud.

During the process that the earbud is taken out from the accommodation groove 51, the first magnet 41 gradually moves away from the second magnet 42, and the first magnet 41 gradually approaches the third magnet 43. When the first magnet 41 is approaching the third magnet 43, the third magnet 43 drives the first magnet 41 to move, the first magnet 41 drives the rack 32 to move in the second movement direction, and when the rack 32 drives the movable part 20 to be at the first position, the first conductive part 21 and the second conductive part 22 avoid the opening of the accommodation chamber 11, to prevent the first conductive part 21 and the second conductive part 22 from being in contact with an external environment, reduce corrosion by air or external moisture, and prevent stains or impurities from contaminating the first conductive part 21 and the second conductive part 22.

Figure 2:
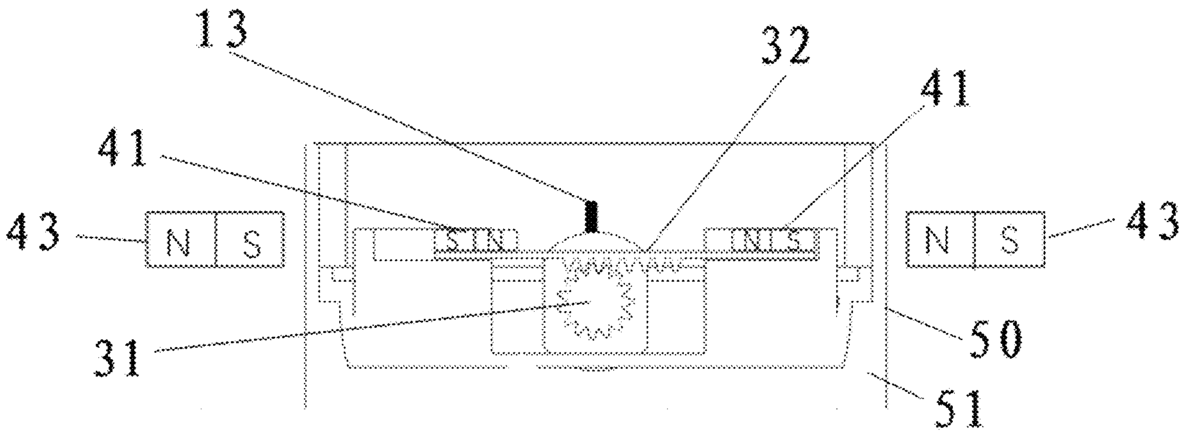
FIG. 2 is a schematic diagram showing rightward movement of a rack.

As shown in FIG. 2 and FIG. 3, first magnets 41 may be arranged at two ends of the rack 32 respectively, and third magnets 43 may be arranged on the earbud case 50 corresponding to the first magnets 41. The first magnet 41 at the left end of the rack 32 and the third magnet 43 on a left side of the rack repel each other, and the first magnet 41 at the right end of the rack 32 and the third magnet 43 on a right side of the rack attract each other, so that the rack 32 moves rightward. The rack 32 drives the gear 31 to rotate, and the gear 31 drives the rotating shaft 30 to rotate. The rotation of the rotating shaft 30 can drive the movable part 20 to rotate, so that the movable part 20 can be at the first position. When the movable part 20 is at the first position, the first conductive part 21 and the second conductive part 22 avoid the opening of the accommodation chamber 11, so as to prevent the first conductive part 21 and the second conductive part 22 from being in contact with an external environment, reduce corrosion by air or external moisture, and prevent stains or impurities from contaminating the first conductive part 21 and the second conductive part 22, thereby preventing the stains or the impurities from contaminating the charging spring sheet in the earbud case 50 when the earbud is placed into the earbud case 50, and avoiding damage to the charging circuit in the earbud case 50.

Figure 5:
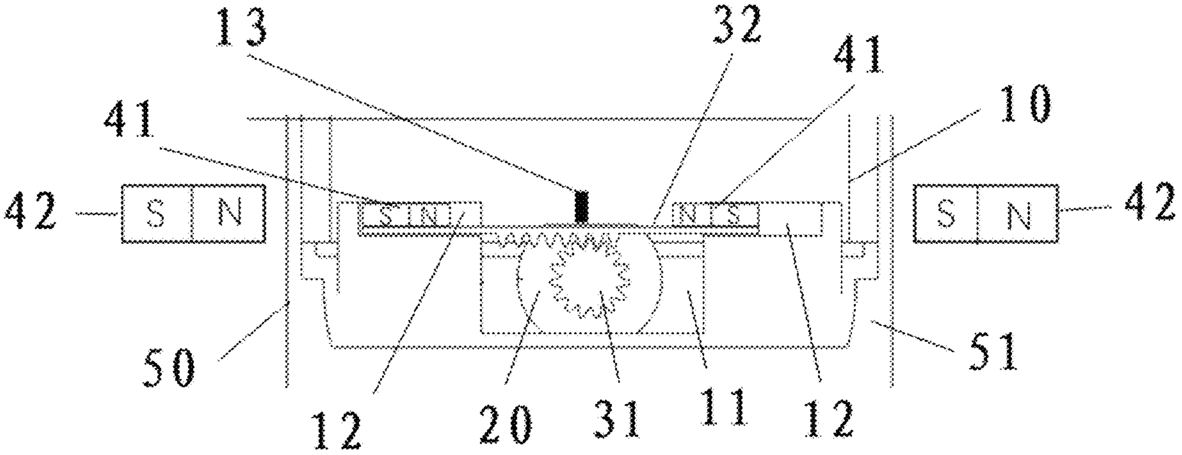
FIG. 5 is a schematic diagram showing leftward movement of a rack.

As shown in FIG. 5 and FIG. 6, first magnets 41 may be arranged at two ends of the rack 32 respectively, and second magnets 42 may be arranged on the earbud case 50 corresponding to the first magnets 41. The first magnet 41 at the left end of the rack 32 and the second magnet 42 on a left side of the rack attract each other, and the first magnet 41 at the right end of the rack 32 and the second magnet 42 on a right side of the rack repel each other, so that the rack 32 moves leftward. The rack 32 drives the gear 31 to rotate, and the gear 31 drives the rotating shaft 30 to rotate. The rotation of the rotating shaft 30 can drive the movable part 20 to rotate, so that the movable part 20 can be at the second position, the first conductive part 21 can be exposed at the opening of the accommodation chamber 11, and the second conductive part 22 may be electrically connected to the first power supply part. Therefore, the first conductive part 21 may be electrically connected to the charging spring sheet in the earbud case 50, so as to charge the earbud.

The embodiments of this application are described above with reference to the accompanying drawings, but this application is not limited to the specific implementations described above, and the specific implementations described above are merely illustrative and not restrictive. A person of ordinary skill in the art may further make many forms under the teaching of this application without departing from the purpose of this application and the protection scope of the claims, and these forms all fall within the protection scope of this application.

What is claimed is:

1. An earbud device, comprising:

an earbud, wherein the earbud comprises a housing and a movable part, the housing is provided with an accommodation chamber with an opening, a first charging contact is arranged on the movable part, the first charging contact avoids the opening of the accommodation chamber when the movable part is at a first position, and the first charging contact is exposed at the opening of the accommodation chamber when the movable part is at a second position; and an earbud case, wherein the earbud case is provided with an accommodation groove, a second charging contact is arranged in the accommodation groove, a driving part is arranged in the earbud case, the driving part drives the movable part to move from the first position to the second position during a process that the earbud is placed into the accommodation groove, and the driving part drives the movable part to move from the second position to the first position during a process that the earbud is taken out from the accommodation groove, wherein when the earbud is placed into the accommodation groove, the first charging contact is electrically connected to the second charging contact.

2. The earbud device according to claim 1, further comprising:

a transmission part, wherein the transmission part comprises:

a rotating shaft, wherein the movable part is arranged on the rotating shaft, the rotating shaft is rotatably arranged on the housing, the driving part is capable of driving the rotating shaft to rotate, and when the rotating shaft rotates, the rotating shaft drives the movable part to move between the first position and the second position.

3. The earbud device according to claim 2, wherein the transmission part further comprises:

a gear, wherein the gear is sleeved on the rotating shaft; and a rack, wherein the rack meshes with the gear, the driving part is capable of driving the rack to move, the rack drives the gear to rotate during movement, and the gear drives the rotating shaft to rotate.

4. The earbud device according to claim 3, wherein the transmission part further comprises:

a first magnet, wherein the first magnet is arranged on the rack, the driving part is capable of driving the first magnet to move, and the first magnet drives the rack to move;

the driving part comprises a second magnet, and the first magnet and the second magnet are capable of magnetically attracting or repelling each other; and during a process that the earbud is placed into the accommodation groove, the second magnet drives the first magnet to move in a first movement direction, and the first magnet drives the movable part to move from the first position to the second position.

5. The earbud device according to claim 4, wherein the driving part comprises a third magnet, and the first magnet and the third magnet are capable of magnetically attracting or repelling each other; and during a process that the earbud is taken out from the accommodation groove, the third magnet drives the first magnet to move in a second movement direction, the first magnet drives the movable part to move from the second position to the first position, and the first movement direction is opposite to the second movement direction.

6. The earbud device according to claim 5, wherein during a process that the earbud is placed into the accommodation groove, the third magnet and the second magnet are sequentially disposed at an interval along a movement direction of the earbud.

7. The earbud device according to claim 3, wherein an inner side wall of the accommodation chamber is provided with a guide groove, and the rack is arranged in the guide groove.

8. The earbud device according to claim 1, wherein the first charging contact comprises a first conductive part and a second conductive part that are disposed at an interval, and the first conductive part is electrically connected to the second conductive part;

when the movable part is at the first position, the first conductive part and the second conductive part avoid the opening of the accommodation chamber; and when the movable part is at the second position, the first conductive part is exposed at the opening of the accommodation chamber, and when the earbud is placed into the accommodation groove, the first conductive part is electrically connected to the second charging contact.

9. The earbud device according to claim 8, wherein the earbud is provided with a first power supply part, and when the movable part is at the second position, the second conductive part is electrically connected to the first power supply part.

10. The earbud device according to claim 1, wherein the earbud further comprises:

a first magnet, wherein the movable part is connected to the first magnet, the driving part comprises a second magnet, and the first magnet and the second magnet are capable of magnetically attracting or repelling each other; and during the process that the earbud is placed into the accommodation groove, the second magnet drives the first magnet to move in a first movement direction, and the first magnet drives the movable part to move from the first position to the second position.

11. The earbud device according to claim 10, wherein the driving part comprises a third magnet, and the first magnet and the third magnet are capable of magnetically attracting or repelling each other; and during a process that the earbud is taken out from the accommodation groove, the third magnet drives the first magnet to move in a second movement direction, the first magnet drives the movable part to move from the second position to the first position, and the first movement direction is opposite to the second movement direction.

12. The earbud device according to claim 11, wherein during a process that the earbud is placed into the accommodation groove, the third magnet and the second magnet are sequentially disposed at an interval in a movement direction of the earbud.

* * * * *